Feb. 1, 1938.    J. P. TRUESDALE    2,106,989
AUTOMOBILE MAP
Filed May 11, 1937
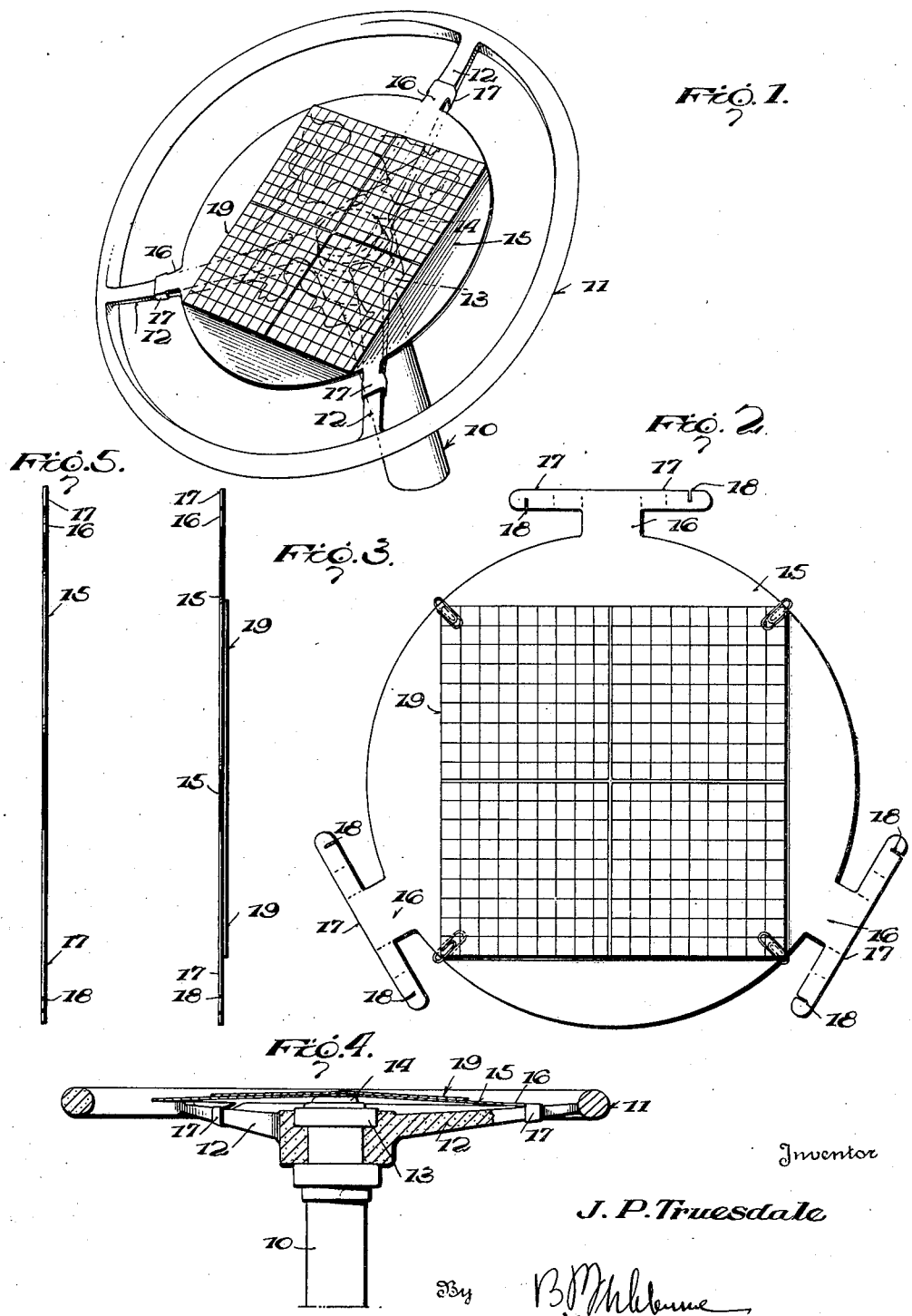
Inventor
J. P. Truesdale
By B. M. Lebrune
Attorney Patented Feb. 1, 1938

2,106,989

UNITED STATES PATENT OFFICE 2,106,989

AUTOMOBILE MAP

Jesse P. Truesdale, Kershaw, S. C.

Application May 11, 1937, Serial No. 142,051

3 Claims. (Cl. 40—20)

My invention relates to automobile maps to be attached to the steering wheel of the automobile.

An important object of the invention is to provide a map which is mounted upon the steering wheel, in a manner to render all portions of the same permanently visible to the driver, and without interfering with the use of the steering wheel or the horn button.

A further object of the invention is to provide means for attaching a map to the spokes of the steering wheel, which means are extremely simple and inexpensive.

A further object of the invention is to provide a supporting or attaching member, upon which a map may be secured, or directly formed thereon.

Other objects and advantages of the invention will be apparent during the course of the following description.

In the accompanying drawing forming a part of this application and in which like numerals are employed to designate like parts throughout the same.

Figure 1 is a perspective view of a map device embodying my invention,

Figure 2 is a plan view of the same,

Figure 3 is an edge elevation of the same,

Figure 4 is a transverse section through the steering wheel, with the map device applied thereto, and, Figure 5 is an elevation of a modified form of map device.

Attention being called first to Figures 1 to 4 inclusive, the numeral 10 designates the steering column of an automobile, carrying the usual steering wheel embodying the rim 11, spokes 12 and a hub 13, which carries the horn button 14. As is well known, on the latest type automobile, the gas and spark levers have been removed from the steering wheel, and the horn button is the only element to be manually actuated, which is carried by the steering wheel.

My map device comprises a supporting element, sheet, or plate 15, which may be formed of celluloid, cardboard, metal or any other material, which is suitably stiff to normally retain its shape, yet flexible or resilient to permit of the actuation of the horn button 14, as will be more fully described. The supporting element or sheet 15 is preferably circular and is provided at points corresponding to the spokes 12 with radial arms or spokes 16. Each arm 16 carries extensions 17, projecting upon opposite sides of the same, and these extensions preferably have slots 18, facing in opposite directions.

The supporting element or plate 15 is applied to the upper side of the steering wheel and covers the horn button 14, and the arms 16 rest upon the spokes 12. The extensions 17 are bent about the spokes and the ends of these extensions are connected by interlocking the slots 18, as is obvious. Any other suitable means may be formed to connect the ends of the extensions 17. When the supporting element or plate 15 is formed of stiff paper or cardboard these extensions may carry glue or gum, which may be moistened to connect the ends of the extensions. As clearly shown in Figure 1, the supporting element or plate 15 is circular, is concentric with respect to the rim 11, and has a much smaller diameter than this rim, whereby the periphery of the support or plate 15 is spaced from the rim. It is thus apparent that the presence of the supporting element or sheet 15 will not interfere with the proper manipulation of the rim by the driver as is well known. Since the supporting element or sheet 15 is resilient or flexible, the horn button 14 may be manually operated by pressing down upon the upper surface of the supporting element or sheet 15.

In this embodiment of the invention, I provide a map 19, which may be printed upon paper or the like, and this map is mounted upon the supporting element or sheet 15 and secured thereto by mucilage or any other suitable means, such as paper clips which could be passed over the supporting element or sheet 15 and the map 19, at the corners of the map. The map 19 is thus made separate from the supporting element or sheet 15, and this would permit of the use of different maps, without necessity of removing the supporting element or sheet 15 from the steering wheel. This would also permit of the maps being made cheaper, as they could be made upon thin stock. The map 19 is shown as the map of a town, but it is obvious that this may be the map of a county, state or states or country, domestic or foreign. It may be a map denoting principally a desired road route.

I also contemplate dispensing with the separate map 19 and printing or otherwise forming the map directly upon the supporting element or sheet 15. This is indicated in the edge elevation in Figure 5. The side elevation of the map shown in Figure 5 would appear identical with the map device shown in Figure 2. When the map is printed or directly formed upon the supporting element or sheet 15, the supporting element or sheet may be formed of flexible material, such as celluloid, cardboard, paper, or any other like material.

When the device is applied to the steering wheel, as shown in Figure 1, it is above the spokes and horn button 14 and hence the entire arrangement of the map is at all times visible to the driver. As before stated, the presence of the map does not interfere with the operation of the horn button.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. The combination with the steering wheel of a vehicle including a rim, and a horn button disposed centrally of the steering wheel, of a flexible sheet having a map or the like thereon, said flexible sheet being applied to the upper side of the steering wheel and arranged generally centrally thereof and covering the horn button, said flexible sheet being smaller than the rim and having its edge spaced from the rim for providing a space between the rim and edge of the sheet, and means to secure the flexible sheet upon the steering wheel.

2. The combination with the steering wheel of a vehicle including a rim and spokes, and a horn button disposed centrally of the steering wheel, of a substantially circular flexible sheet having a map thereon, said flexible sheet being applied to the upper side of the steering wheel and covering the button, said sheet having a smaller diameter than the rim and arranged in substantial concentric relation to the rim for providing a space between the rim and the edge of the sheet, radial arms carried by the sheet and arranged upon the spokes, and means to attach the radial arms to the spokes.

3. The combination with the steering wheel of a vehicle including a rim and spokes, and a horn button disposed centrally of the steering wheel, of a flexible supporting sheet disposed upon the upper side of the steering wheel and covering the button, the supporting sheet being smaller than the rim and arranged substantially centrally with relation thereto for affording a passage between the rim and the edge of the sheet, radial arms secured to the supporting sheet and corresponding in arrangement to the spokes, means to attach the arms to the spokes, and a flexible sheet having a map thereon secured to the supporting sheet.

JESSE P. TRUESDALE.